United States Patent [19]

Akimoto

[11] Patent Number: 5,676,108
[45] Date of Patent: Oct. 14, 1997

[54] COMBUSTION CONTROL SYSTEM FOR FOUR CYCLE DIRECT INJECTION ENGINE AND THE METHOD THEREOF

[75] Inventor: Akira Akimoto, Musashino, Japan

[73] Assignee: Fuji Jukogyo Kabushiki Kaisha, Tokyo, Japan

[21] Appl. No.: 654,410

[22] Filed: May 28, 1996

[30] Foreign Application Priority Data

Jun. 22, 1995 [JP] Japan ............................ 7-156355

[51] Int. Cl.$^6$ ........................... F02B 3/02; F02B 3/04
[52] U.S. Cl. ........................................................ 123/305
[58] Field of Search ........................................... 123/305

[56] References Cited

U.S. PATENT DOCUMENTS 5,333,583  8/1994  Matsuura ............................ 123/305

*Primary Examiner*—Andrew M. Dolinar
*Attorney, Agent, or Firm*—Beveridge, DeGrandi, Weilacher & Young, L.L.P.

[57] ABSTRACT

A combustion control system and method of a four cycle direct injection engine includes an igniter for igniting simultaneously in two cylinders, a firing cylinder and an off-firing cylinder. In the combustion control system, it is judged whether or not the spark discharge period following the ignition timing overlaps with the fuel injection period following the fuel injection starting timing. If it is judged not to overlap, the fuel injection starting timing determined based on the engine speed and the fuel injection amount is let be a final fuel injection starting timing. If it is judged to overlap, the spark discharge ending timing is obtained from the ignition timing and the spark discharge period and this spark discharge ending timing is let be a final fuel injection starting timing. By delaying the fuel injection starting timing until the final fuel injection starting timing, it is possible to prevent the off-firing cylinder from being fired when the igniter ignites simultaneously in the firing and off-firing cylinders.

5 Claims, 5 Drawing Sheets

F I G. 3
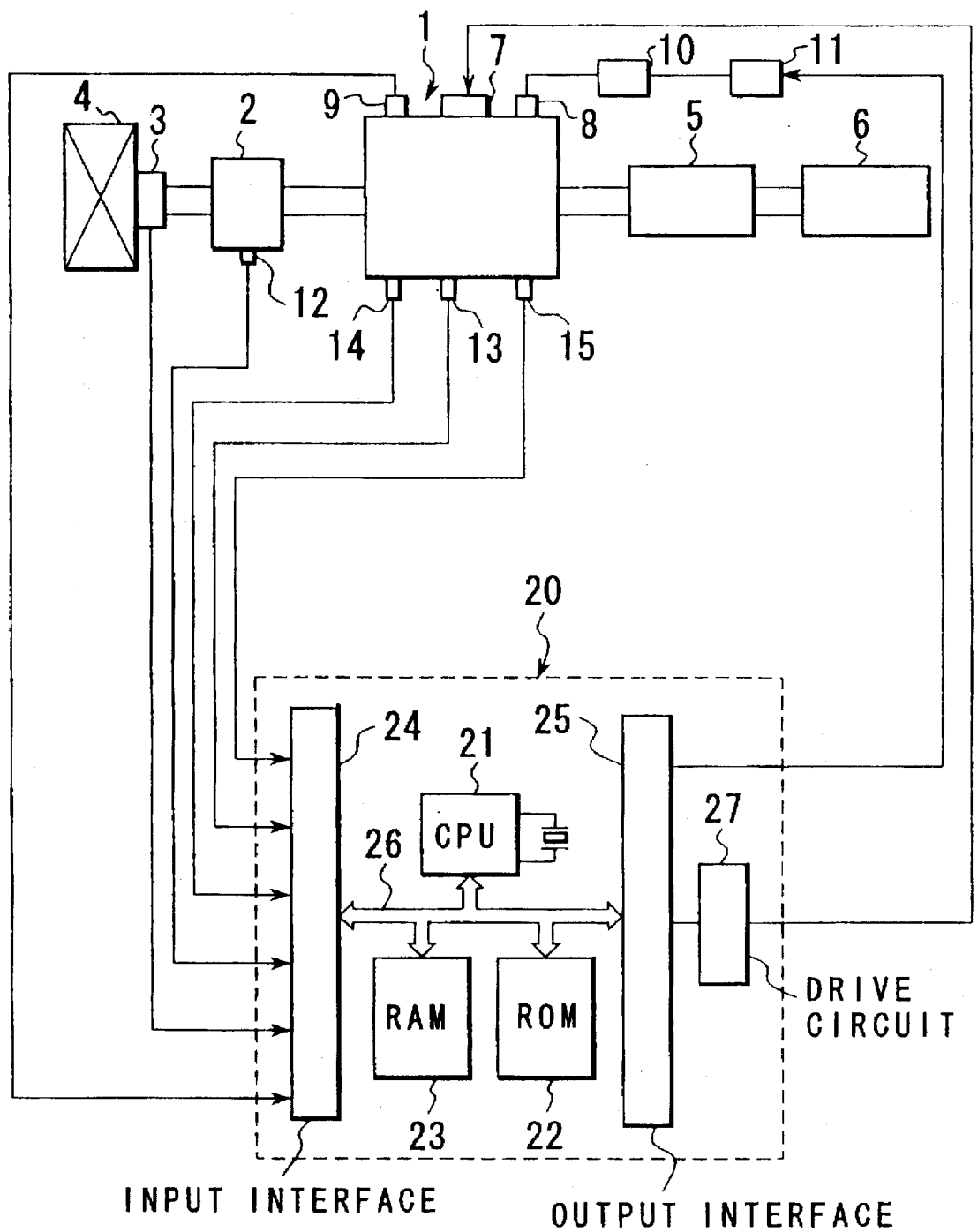

1
COMBUSTION CONTROL SYSTEM FOR FOUR CYCLE DIRECT INJECTION ENGINE AND THE METHOD THEREOF

BACKGROUND OF THE INVENTION

1. Field of the Invention

The present invention relates to a combustion control system and method for a four cycle direct fuel injection engine and particularly to a combustion control system and method for a direct fuel injection engine simultaneously ignited in two different cylinders.

2. Prior Arts

Generally, since a port injection type engine has a high charging efficiency and a homogeneous combustion, the port injection is fit for an engine producing high power. In a direct injection engine, in order to achieve a similar performance to the port injection engine, it is necessary that a greater part of fuel is injected in an early stage of the intake stroke for raising a charging efficiency and for securing a sufficient vaporization of fuel. Therefore, it is desirable to advance the injection timing as far as possible.

However, setting the injection timing too early is not undesirable because injected fuel comes out through the exhaust valve. Generally, the proper injection timing is determined in the neighborhood of the top dead center of the intake stroke according to engine speed and engine load.

Further, it is necessary to ignite mixture gas thus formed in a proper timing. For example, Japanese Unexamined Patent Application Toku-Kai-Hei 5-086948 discloses a technique in which ignition timing is determined according to the finishing timing of fuel injection to coincide the timing of proper mixture formation with the proper ignition timing.

In applying this technique to a so-called simultaneous ignition system whose purpose is lowering manufacturing cost of the ignition system by igniting simultaneously in two different cylinders, a firing cylinder and an off-firing cylinder when the ignition timing overlaps with the injection timing in those two cylinders, problems such as power-downing or degraded emissions due to preignition, backfires and the like may occur in the off-firing cylinder. This overlapping of ignition timing and injection timing takes place during a transfer process of engine speed being changed abruptly or when the ignition timing is needed to be delayed for controlling knockings.

It is possible to delay the injection timing together with the ignition timing, however it is inevitable that the engine output goes down.

SUMMARY OF THE INVENTION

It is therefore an object of the present invention to provide a combustion control system and method capable of preventing the off-firing cylinder from being fired unnecessarily when ignition is applied simultaneously to two different cylinders.

To achieve the above object, the combustion control system according to the present invention comprise:

injection starting timing determining means for determining a fuel injection starting timing based on an engine speed and an engine load;

preignition period determining means for determining a preignition period in the off-firing cylinder based on engine operating conditions;

preignition preventing timing determining means for determining a preignition preventing fuel injection starting timing in the off-firing cylinder based on the preignition period; and final injection starting timing determining means for letting the fuel injection starting timing be a final fuel injection starting timing in the off-firing cylinder when the preignitino preventing fuel injection starting timing is earlier than the fuel injection starting timing and for letting the preignitino preventing fuel injection starting timing be a final fuel injection starting timing in the off-firing cylinder when the fuel inejction starting timing is later than the preignition preventing fuel injection starting timing.

BRIEF DESCRIPTION OF THE DRAWINGS

FIG. 3 is a schematic diagram showing an engine control system according to a first embodiment of the present invention;

DETAILED DESCRIPTION OF PREFERRED EMBODIMENTS

Figure 1:
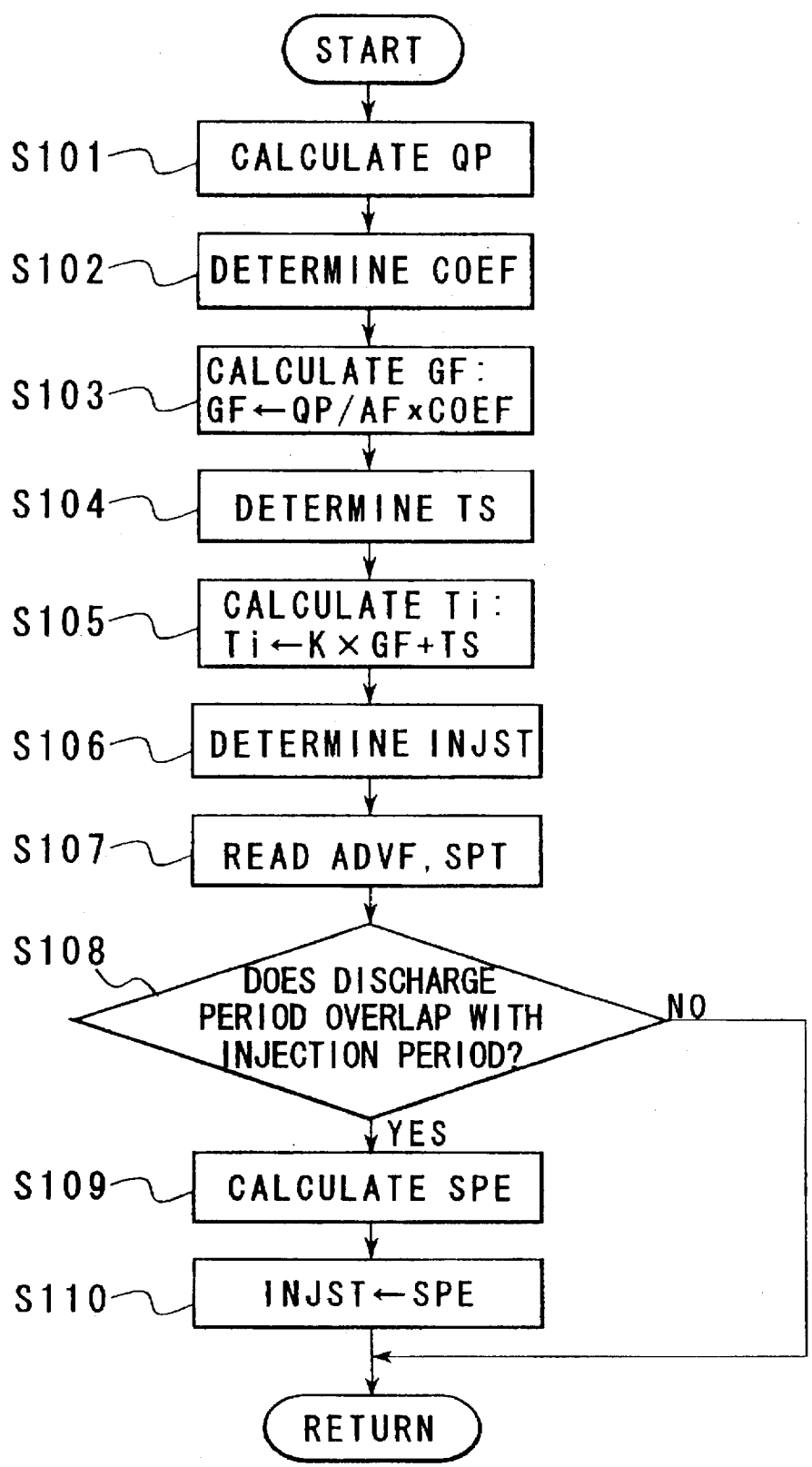
FIG. 1 is a flowchart showing a fuel injection routine according to a first claim of the present invention.

Referring now to FIG. 3, numeral 1 denotes a spark ignition direct fuel injection engine in which fuel is injected directly into a cylinder and mixture gas is ignited by spark ignition. In the air intake system of the engine 1, there is provided a throttle body 2 having a throttle valve therein. Further, an air cleaner 4 is connected with the upstream portion of the throttle body 2 through an airflow meter 3. On the other hand, there is provided a catalytic converter 5 for purifying exhaust gas in the exhaust system of the engine 1 and a muffler 6 is connected with the downstream portion of the catalytic converter 5.

In a combustion chamber of the engine 1, there are provided an injector 7 for injecting fuel with high pressure directly and a spark plug 8 for igniting a mixture of air and injected fuel by spark ignition. Further, in the combustion chamber, there is provided a cylinder pressure sensor 9 for detecting a cylinder pressure. The spark plug 8 is connected with the secondary winding side of an ignition coil 10 and an igniter 11 which is driven by an electronic control unit (ECU) 20 is connected with a primary winding side of the ignition coil 10.

The ignition coil 10 is provided per two cylinders whose phase differs from each other by 360 degrees and a simultaneous ignition is performed in the two cylinders (one cylinder during compression stroke and other one during exhaust stroke). In this embodiment, the engine 1 is a four cylinders engine and ignition is performed simultaneously, for example, in #1 and #3 cylinders and then in #2 and #4 ones.

The ECU 20 comprises a main processor CPU 21, a ROM 22 for storing fixed data such as control programs, miscellaneous tables, a RAM 23 for storing data after processing signals from miscellaneous sensors and data processed by the CPU 21, an input interface 24 for inputting signals from miscellaneous engine sensors, an output interface 25 for outputting control signals from the CPU 21 to miscellaneous actuators and a bus line 26 for interconnecting these devices.

The input interface 24 is connected with the airflow meter 3, the cylinder pressure sensor 9, a throttle opening angle sensor 12 for detecting an opening angle of the throttle valve provided in the throttle body 2, a crank angle sensor 13 for detecting a crank angle of the engine 1, a cylinder number discrimination sensor 14 for discriminating a cylinder number in which fuel is to be injected or spark is to be ignited, and miscellaneous sensors such as a coolant temperature sensor 15 for detecting coolant temperature of the engine 1. On the other hand, the output interface 25 is connected with the igniter 11 and miscellaneous actuators like a fuel injector 7 through a drive circuit 27.

In the CPU 21, miscellaneous control values such as the amount of fuel injection and ignition timing are calculated based on the data stored in the RAM 23 according to the control program stored in the ROM 22 and corresponding signals are outputted to the fuel injector 7, the igniter 11 and the like for controlling combustion of the engine 1.

The fuel injection timing of the engine 1 is determined in the neighborhood of the top dead center of the suction stroke. In the normal operating condition of the engine excepting the case described below, the proper fuel injection timing is determined by referring to tables parameterizing engine speed and engine load.

However, since the ignition system of the engine 1 introduces a simultaneous ignition method, there is a possibility that a preignition occurs during the suction stroke in an off-firing cylinder, if fuel is injected according to the proper injection timing obtained from that table. Hence, in this embodiment, when the discharge period of the spark plug 8 overlaps with the proper fuel injection timing, since the preignition is expected to occur in the off-firing cylinder, the aspect of the present invention is to delay the starting time of fuel injection and to avoid this overlapping period.

Next, the process of preventing the preignition will be described with reference to the flowcharts shown in FIG. 1 and FIG. 2.

FIG. 1 is a flowchart for determining fuel injection and this flowchart is executed at a specified interval. First, at S101 the air amount QP to be sucked in one cylinder during the suction stroke is calculated. The air amount QP is obtained from the intake air amount Q detected by the airflow meter 3 based on the time for ½ revolution of the engine. The time for ½ revolution is obtained from the output signal of the crank angle sensor 13.

Next, the program goes to S102 where miscellaneous increment correction coefficients COEF such as ones for engine stating, ones for cold starting, ones for wide open throttle and others, are determined based on the output values from the the throttle opening angle sensor 12 and the coolant temperature sensor 15 and then at S103 the fuel injection amount per one injection GF is calculated based on the air amount per on cylinder QP, the target air-fuel ratio AF and the miscellaneous increment coefficients COEF. The fuel injection amount GF is calculated according to a formula GF←QP/AFx.

Here, the target air-fuel ratio AF is in general a theoretical air-fuel ratio but may be obtained by referring to tables on which optimum air-fuel ratios are stored. Those tables are prepared, for example for a specific area determined by the engine speed Ne and the air amount QP which means the engine load.

At the next step S104, a voltage correction amount TS for correcting a response dead time of the fuel injector 7 based on the battery voltage VB is determined by referring to tables or the like. Then, at S105 a final fuel injection amount Ti is obtained by adding the voltage correction amount TS to the fuel injection amount per one injection GF Ti←K× GF+TS; where K is an injector correction coefficient).

After that, the program goes to S106 where a fuel injection starting time INJST (expressed in crank angle or time) is determined based on the engine speed Ne and the fuel injection amount Ti (corresponding to the engine load) by referring to tables. This fuel injection starting time INJST is set at an early stage of the intake stroke in order to raise a charge efficiency and to obtain a good air-fuel mixture, as described before. It is necessary to advance the fuel injection starting timing to the extent that fuel does not escape from the exhaust port. These optimum values are obtained by experiments or calculations beforehand and are stored on tables determined for each operational condition parameterizing the engine speed Ne and the fuel injection amount Ti. As for a parameter presenting operational condition, the fuel injection amount per one injection GF or the air amount per one cylinder QP may be used in place of the fuel injection amount Ti.

Figure 2:
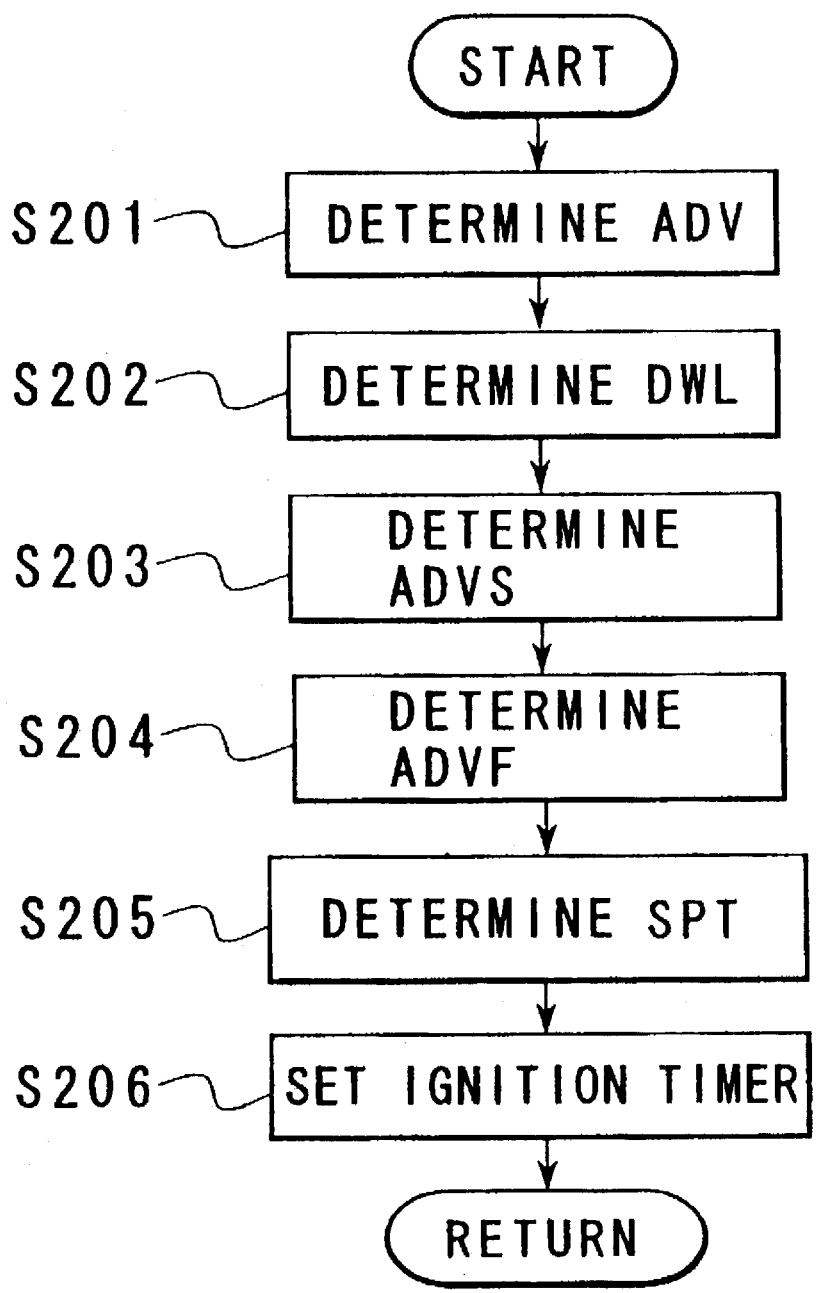
FIG. 2 is a flowchart showing an ignition routine according to a first claim of the present invention.
Figure 4:
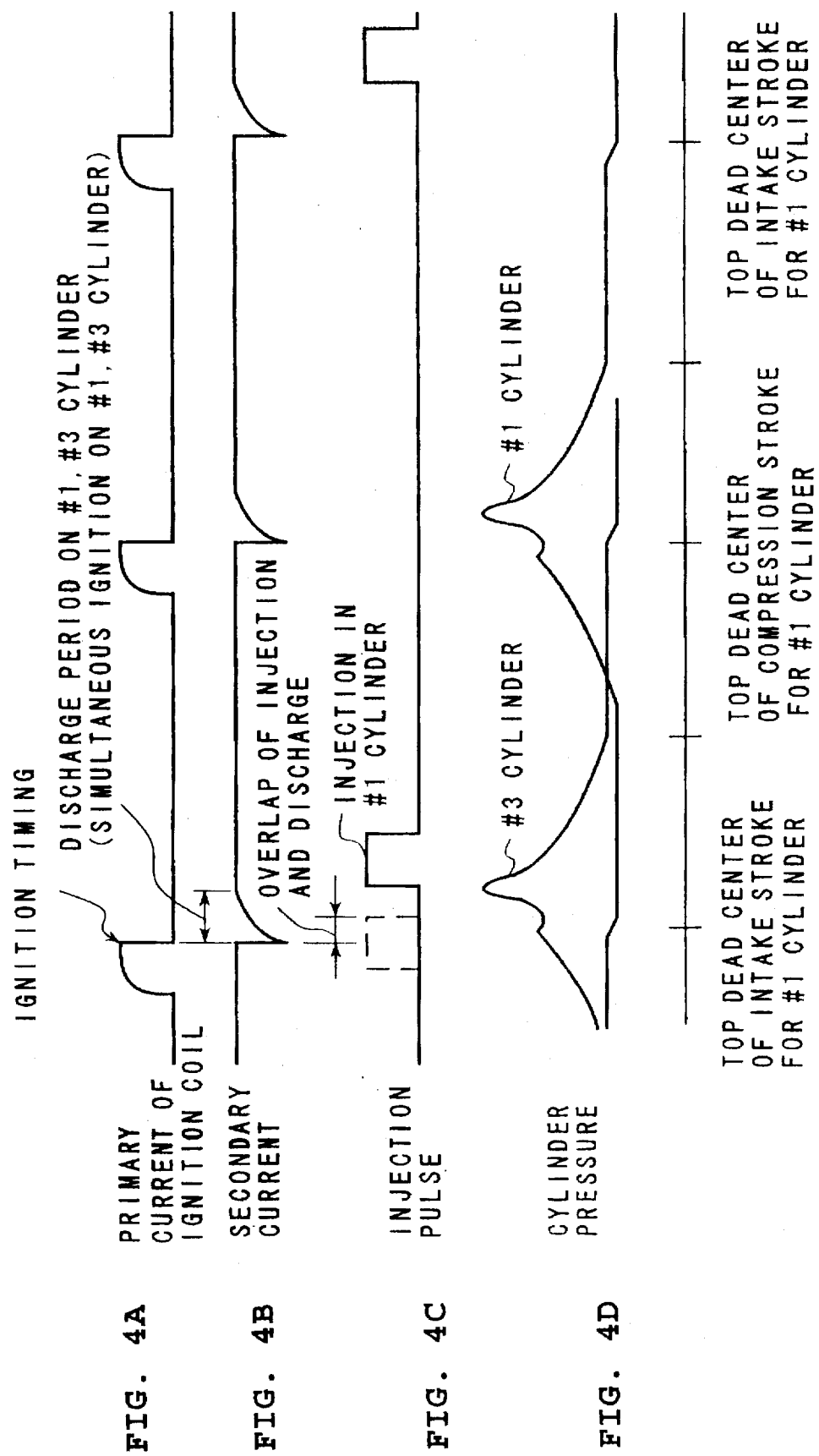
FIGS. 4A-4D are a diagram showing an overlapping of fuel injection and ignition.

Further, at S107 an ignition timing ADVF which is determined by an ignition timing determining routine shown in FIG. 2 and a discharge period SPT determined by the same routine are read.

Here, the above ignition timing determining routine will be described. This routine is carried out at a specified interval. First, at S201 a basic ignition timing ADV (expressed in crank angle or time) is determined based on the engine speed Ne and the fuel injection amount per one injection GF by referring to tables. Next, at S202 an energized period of the ignition coil 10, i.e., a dwell period (in crank angle or time) DWL is determined based on the battery voltage VB by referring to tables.

Further, at S203 miscellaneous correction values ADVS such as a coolant temperature correction coefficient, a knock retard correction coefficient and the like are determined and at S204 a final ignition timing ADVF is obtained by correcting the basic ignition timing ADV using these correction values ADVS (ADVF ADV+ADVS).

Then, the program goes to S205 where the discharge period SPT of the spark plug 8 is obtained based on the engine speed Ne and the fuel injection amount GF by referring to tables and are stored in a designated address of the RAM 23. Then, at S206 the dwell period DWL and the ignition timing ADVF are set in an ignition timer and the program goes out of the routine.

The above discharge period SPT may be determined by tables parameterizing the engine speed Ne and/or the engine load. In another, simpler way, fixed values may be employed instead of tables. These fixed values are for example established beforehand in consideration of ignition characteristics of the igniter 11, the ignition coil 10, the spark plug 8 and the like.

As described above, the ignition timing ADVF and the discharge period SPT are read at S107 and the fuel injection determining routine steps to S108. When the routine goes to S108, it is judged whether or not the discharge period SPT following the ignition timing ADVF overlaps with the fuel injection period Ti following the fuel injection starting time INJST in the off-firing cylinder, that is, the cylinder not to be ignited among cylinders subjected to simultaneous ignition.

If it is judged that the discharge period does not overlap with the fuel injection period, the program goes out of the routine without renewing the fuel injection starting time INJST determined at S106. In this case, the final injection timing is the fuel injection starting time INJST. On the other hand, if it is judged that the discharge period overlaps with the fuel injection period, the program goes to S109 where a discharge ending timing SPE (expressed in crank angles or time) is obtained from the ignition timing ADVF and the discharge period SPT. Then, at S110 the fuel injection starting timing INJST is renewed by this discharge ending time SPE (INJST=SPE) and after that the program goes out of the routine. Thus, the fuel injection starting timing INJST is delayed.

As shown in FIGS. 4A–4D, in case where the #3 and #1 cylinders are simultaneously ignited and the #3 cylinder is a firing cylinder, since the fuel injection period (shown by a broken line) of the #1 cylinder, an off-firing cylinder overlaps with the discharge period, there is a fear of preignition in the #1 cylinder during the intake stroke. As clearly understood by FIGS. 4A–4D, the preignition at #1 cylinder can be prevented by delaying the fuel injection starting timing of the #1 cylinder until the ending time of spark discharge.

Figure 5:
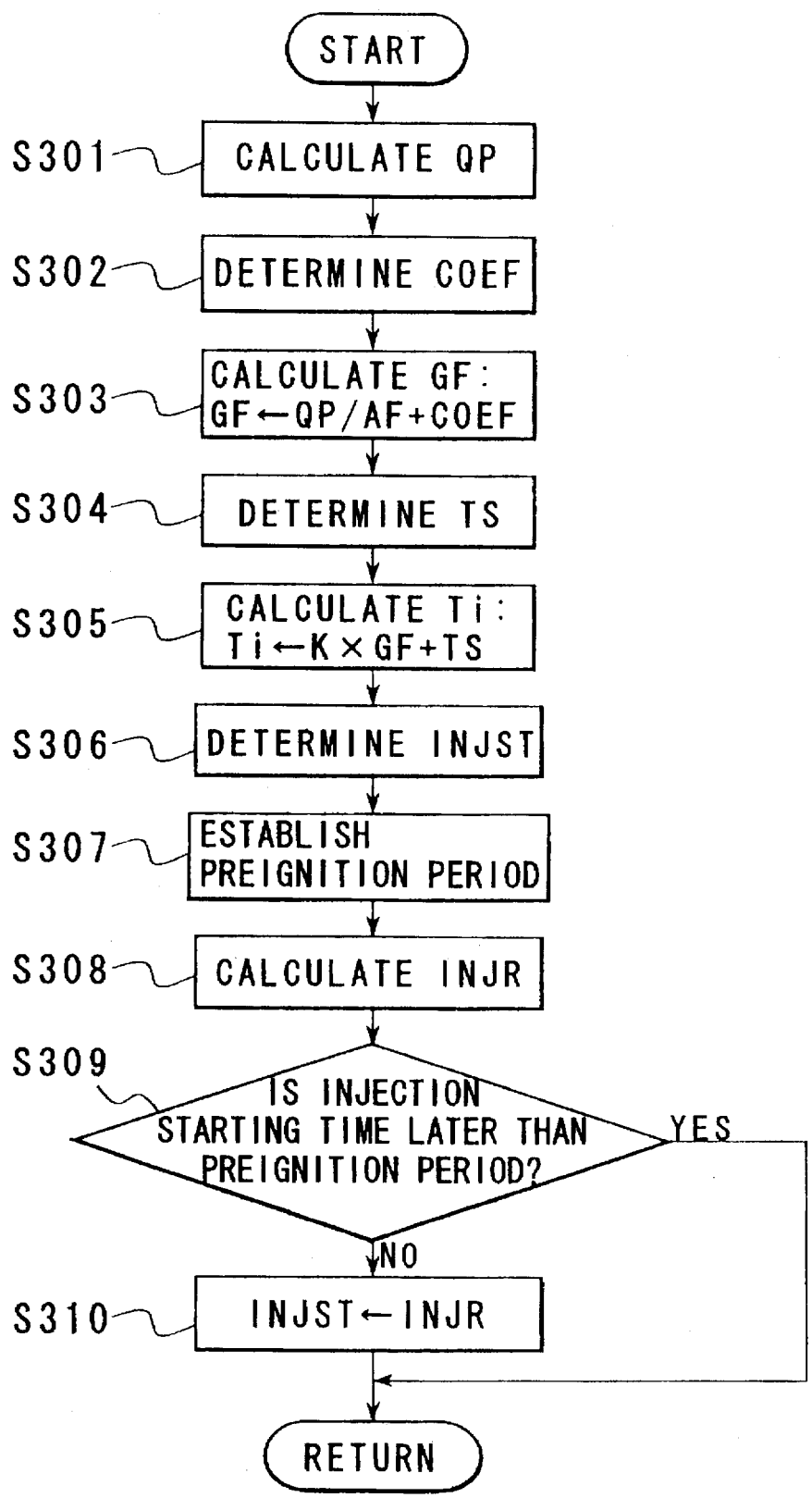
FIG. 5 is a flowchart showing a fuel injection routine according to a second embodiment of the present invention.

FIG. 5 is a flowchart showing a routine for determining fuel injection timing according to a second embodiment of the present invention.

In the first embodiment described before, the preignition in the off-firing cylinder is prevented by deeming the period during which the preignition occurs in the off-firing cylinder to be the period during which the fuel injection period overlaps with the ignition discharge period. Strictly speaking, however, in actual operating conditions of engine, the fuel injection period does not always overlap with the ignition discharge period because the firing characteristics of the mixture changes according to the time lag of fuel injection, the state of fuel vaporization and the existence or non-existence of knocking.

In the second embodiment, first a preignition period during which the preignition occurs is determined beforehand from the engine operating conditions and then, based on this preignition period, the fuel injection timing at which the preignition does not occur (hereinafter referred to as the preignition-free fuel injection starting timing) is calculated. If this fuel injection starting timing comes later than the optimum fuel injection starting timing obtained by referring to tables, this preignition-free fuel injection starting timing is let be a final fuel injection starting timing.

The fuel injection determining routine according to the second embodiment is described with reference to the accompanying flowchart shown in FIG. 5.

Steps from S301 to S306 are exactly the same as the steps from S101 to S106 according to the first embodiment. After setting the optimum fuel injection starting timing INJST obtained by referring to tables parameterizing the engine speed and the engine load, the program goes to S307 where the preignition period is determined by referring to tables parameterizing the engine operating conditions. These tables are obtained for example from experiments to see what timing the preignition occurs in when miscellaneous engine operating conditions such as coolant temperature, fuel temperature, intake air temperature, fuel injection amount per one injection, engine speed and the like are changed.

Next, at S308 the preignition-free fuel injection starting timing at which the preignition does not occur, INJR (expressed in crank angle or time) is obtained and at S309 it is checked whether or not the optimum fuel injection starting timing INJST is later than the preignition-free fuel injection starting timing INJR.

If it is judged at S309 that the optimum fuel injection starting timing INJST is later than the preignition-free fuel injection starting timing INJR, the optimum fuel injection starting timing INJST which is obtained from tables is let to be a final fuel injection timing and the program goes out of the routine. If it is judged that the optimum fuel injection starting timing INJST comes earlier than the preignition-free fuel injection starting timing INJR, the optimum fuel injection starting timing INJST is renewed by the preignition-free fuel injection starting timing INJR (INJST INJR) and the routine is finished.

In summary, according to the present invention it is judged whether or not the spark discharge period SPT following the ignition timing ADVF overlaps with the fuel injection period Ti following the fuel injection starting timing INJST. If it is judged not to overlap, the fuel injection starting timing INJST determined based on the engine speed Ne and the fuel injection amount Ti is let be the final fuel injection starting timing. If it is judged to overlap, the spark discharge ending timing SPE is obtained from the ignition timing ADVF and the spark discharge period SPT and this spark discharge ending timing SPE is let be the final fuel injection starting timing. By delaying the fuel injection starting timing INJST until the final fuel injection starting timing, it is possible to prevent the off-firing cylinder from being fired at the simultaneous ignition.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A combustion control system of a four cycle direct fuel injection engine having, a throttle valve, a spark plug for igniting an air-fuel mixture, a crank angle sensor for detecting an engine speed and for generating an engine speed signal and an igniter for simultaneously igniting said air-fuel mixture in two cylinders, a firing cylinder and an off-firing cylinder, comprising:

injection starting timing determining means for determining a fuel injection starting timing based on an engine speed and an engine load;

preignition period determining means responsive to said engine speed signal for determining a preignition period in said off-firing cylinder based on engine operating conditions;

preignition preventing timing determining means for determining a preignition preventing fuel injection starting timing in said off-firing cylinder based on said preignition period; and final injection starting timing determining means for letting said fuel injection starting timing be a final fuel injection starting timing in said off-firing cylinder when said preignition preventing fuel injection starting timing is earlier than said fuel injection starting timing and for letting said preignition preventing fuel injection starting timing be a final fuel injection starting timing in said off-firing cylinder when said preignition preventing fuel injection starting timing is later than said fuel injection starting timing.

2. The system according to claim 1, wherein
said engine operating conditions include at least one parameter among a coolant temperature, a fuel temperature, an intake air temperature, an engine load, or an engine speed.

3. A combustion control system of a four cycle direct fuel injection engine having an igniter for simultaneously igniting in two cylinders, a firing cylinder and an off-firing cylinder, comprising:

ignition timing determining means for determining an ignition timing;

spark discharge period determining means for determining a spark discharge period;

spark discharge ending timing determining means for determining a spark discharge ending timing based on said ignition timing and said spark discharge period;

injection starting timing determining means for determining a fuel injection starting timing;

injection period determining means for determining a fuel injection period; and final injection starting timing determining means for letting said fuel injection starting timing be a final fuel injection starting timing in said off-firing cylinder when said spark discharge period following said ignition timing does not overlap with said fuel injection period following said fuel injection starting timing and for letting said spark discharge ending timing be a final fuel injection starting timing in said off-firing cylinder when said spark discharge period following said ignition timing overlaps with said fuel injection period following said fuel injection starting timing.

4. A combustion control method of a four cycle direct fuel injection engine having an igniter for simultaneously igniting in two cylinder, a firing cylinder and an off-firing cylinders, comprising the steps of:

determining a fuel injection starting timing based on an engine speed and an engine load;

determining a preignition period in said off-firing cylinder based on engine operating conditions;

determining a preignition preventing fuel injection starting timing in said off-firing cylinder based on said preignitino period; and letting said fuel injection starting timing be a final fuel injection starting timing in said off-firing cylinder when said preignition preventing fuel injection starting timing is earlier than said fuel injection starting timing and letting said preignition preventing fuel injection starting timing be a final fuel injection starting timing in said off-firing cylinder when said preignition preventing fuel injection starting timing is later than said fuel injection starting timing.

5. A combustion control method of a four cycle direct fuel injection engine having an igniter for simultaneously igniting in two cylinders, a firing cylinder and an off-firing cylinder, comprising:

determining an ignition timing;

determining a spark discharge period;

determining a spark discharge ending timing based on said ignition timing and said spark discharge period;

determining a fuel injection starting timing;

determining a fuel injection period; and letting said fuel injection starting timing be a final fuel injection starting timing in said off-firing cylinder when said spark discharge period following said ignition timing does not overlap with said fuel injection period following said fuel injection starting timing and letting said spark discharge ending timing be a final fuel injection starting timing in said off-firing cylinder when said spark discharge period following said ignition timing overlaps with said fuel injection period following said fuel injection starting timing.

* * * * *